United States Patent
Haensch et al.

(10) Patent No.: US 10,243,421 B2
(45) Date of Patent: Mar. 26, 2019

(54) MOTOR VEHICLE AUXILIARY ASSEMBLY ELECTRIC MOTOR

(71) Applicant: PIERBURG PUMP TECHNOLOGY GMBH, Neuss (DE)

(72) Inventors: Wolfgang Haensch, Magdeburg (DE); Maik Waberski, Neustadt (DE); Michael Weinert, Leisnig (DE); Joerg Hartzendorf, Muehlau (DE); Ronald Rathke, Doebeln (DE); Thomas Wienecke, Willich (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 455 days.

(21) Appl. No.: 15/115,695

(22) PCT Filed: Jan. 23, 2015

(86) PCT No.: PCT/EP2015/051396
§ 371 (c)(1),
(2) Date: Aug. 1, 2016

(87) PCT Pub. No.: WO2015/121052
PCT Pub. Date: Aug. 20, 2015

(65) Prior Publication Data
US 2017/0170701 A1   Jun. 15, 2017

(30) Foreign Application Priority Data
Feb. 12, 2014 (EP) .................................. 14154904

(51) Int. Cl.
*H02K 5/10* (2006.01)
*H02K 5/128* (2006.01)
(Continued)

(52) U.S. Cl.
CPC ............ *H02K 5/10* (2013.01); *H02K 5/128* (2013.01); *H02K 11/30* (2016.01); *H02K 11/33* (2016.01);
(Continued)

(58) Field of Classification Search
CPC .. H02K 5/08; H02K 5/10; H02K 5/12; H02K 11/30
(Continued)

(56) References Cited

U.S. PATENT DOCUMENTS

| 5,894,180 A | * | 4/1999 | Volz | ...................... | B60T 8/4022 |
| | | | | | 310/88 |
| 2003/0098624 A1 | * | 5/2003 | Iwasa | .................... | F04B 35/002 |
| | | | | | 310/112 |

(Continued)

FOREIGN PATENT DOCUMENTS

| CN | 101461294 A | 6/2009 |
| DE | 44 44 643 A1 | 6/1996 |

(Continued)

*Primary Examiner* — Terrance L Kenerly
(74) *Attorney, Agent, or Firm* — Norman B. Thot

(57) ABSTRACT

A motor vehicle auxiliary assembly electric motor includes a motor stator with stator coils. The motor stator is electronically commutated. A control electronics system drives the stator coils and is potted in a cast body. An electronics chamber is closed-off and has the control electronics system and the cast body arranged therein. A gas chamber is arranged adjacent to the cast body. A pressure equalization element ventilates and vents the gas chamber. An aeration shaft is arranged to pass through the cast body and fluidically connects the gas chamber to the atmosphere. The pressure equalization element is fluidically associated with the aeration shaft.

9 Claims, 1 Drawing Sheet

(51) Int. Cl.
*H02K 11/30* (2016.01)
*H02K 11/33* (2016.01)
*H02K 5/08* (2006.01)
*B60L 11/00* (2006.01)

(52) U.S. Cl.
CPC ............ *B60L 11/002* (2013.01); *H02K 5/08* (2013.01); *H02K 2205/09* (2013.01)

(58) Field of Classification Search
USPC ..................................... 310/88, 89
See application file for complete search history.

(56) References Cited

U.S. PATENT DOCUMENTS

| | | | |
|---|---|---|---|
| 2005/0238518 A1* | 10/2005 | Ginies | F04B 39/023 417/559 |
| 2006/0053577 A1 | 3/2006 | Moein et al. | |
| 2010/0019629 A1 | 1/2010 | Amaya et al. | |
| 2014/0127055 A1* | 5/2014 | Horiba | H02K 3/34 417/410.5 |

FOREIGN PATENT DOCUMENTS

| | | | | |
|---|---|---|---|---|
| DE | 196 46 617 A1 | 5/1998 | | |
| DE | 197 27 164 A1 | 1/1999 | | |
| DE | 10 2006 033 1 | 1/2008 | | |
| EP | 1 921 020 A1 | 5/2008 | | |
| EP | 2 012 572 A1 | 1/2009 | | |
| GB | 1156123 | * | 6/1969 | ............ H02K 5/132 |
| WO | WO 2007/035668 A2 | 3/2007 | | |

\* cited by examiner

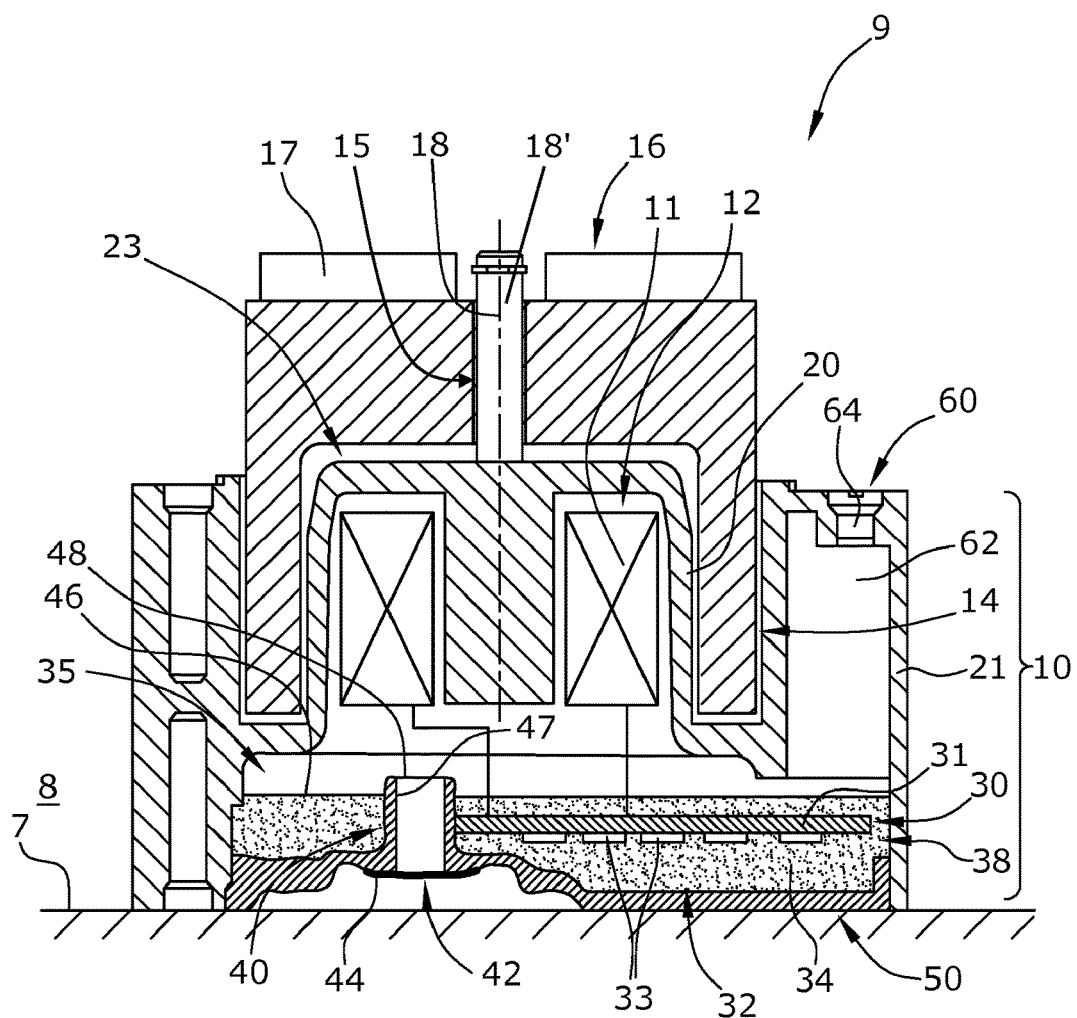

MOTOR VEHICLE AUXILIARY ASSEMBLY ELECTRIC MOTOR

CROSS REFERENCE TO PRIOR APPLICATIONS

This application is a U.S. National Phase application under 35 U.S.C. § 371 of International Application No. PCT/EP2015/051396, filed on Jan. 23, 2015 and which claims benefit to European Patent Application No. 14154904.8, filed on Feb. 12, 2014. The International Application was published in German on Aug. 20, 2015 as WO 2015/121052 A1 under PCT Article 21(2).

FIELD

The present invention relates to a motor vehicle auxiliary assembly electric motor for use as a drive motor of an auxiliary assembly in a motor vehicle.

BACKGROUND

Such auxiliary assemblies can, for example, be water pumps, water circulating pumps, vacuum pumps, compressed-air pumps, lubricant pumps, air-conditioning compressors or also actuators for headlights, locking systems, throttle valves etc. As auxiliary assembly electric motors, use is made of so-called "canned motors" because of their resistance to wear and the hermetic separability of the motor rotor and the motor stator, wherein the canned motors (corresponding to their inherent principle) comprise an electronic commutation, i.e., are designed as so-called brushless electric motors. For the commutation of the stator coils, the electric motor comprises a control electronics system which, in relation to the separating can, is arranged on the closed side in an electronics chamber.

DE 196 46 617 A describes an electric coolant pump wherein the electronics chamber is arranged in a separate casing. Even though the control electronics system is well-protected against the wet area in which the motor rotor is arranged, humidity may still happen to intrude into the electronics chamber also from the pump surroundings and influence or damage the control electronics system. Since air is enclosed in the electronics chamber, it is required, for pressure equalization, to provide a corresponding pressure equalization element which may again cause intrusion of humidity therethrough.

DE 10 2006 033 175 A1 describes a control electronics system to control an electric motor which is entirely encapsulated in a casting compound so that the control electronics system is sealed in a liquid-tight manner against the intrusion of humidity. Before the control electronics system is installed in a motor casing, it has thus already been encapsulated in a casting compound. For this purpose, the control electronics system must first be placed in a cast casing which is then filled with a casting compound. The cast casing must be removed after the casting compound has been cured.

SUMMARY

An aspect of the present invention is to provide an electronically commutated motor vehicle auxiliary assembly electric motor which can be produced in a simple manner and which provides good humidity protection for the control electronics system.

In an embodiment, the present invention provides a motor vehicle auxiliary assembly electric motor which includes a motor stator comprising stator coils. The motor stator is configured to be electronically commutated. A control electronics system is configured to drive the stator coils and is potted in a cast body. An electronics chamber is configured to be closed-off and to have the control electronics system and the cast body be arranged therein. A gas chamber is arranged adjacent to the cast body. A pressure equalization element is configured to ventilate and vent the gas chamber. An aeration shaft is arranged to pass through the cast body and is configured to fluidically connect the gas chamber to the atmosphere. The pressure equalization element is fluidically associated with the aeration shaft.

BRIEF DESCRIPTION OF THE DRAWINGS

The present invention is described in greater detail below on the basis of embodiments and of the drawing in which:

FIG. 1 shows a longitudinal sectional view of a motor vehicle coolant pump with an electronically commutated electric motor for driving a pump rotor.

DETAILED DESCRIPTION

The motor vehicle auxiliary assembly electric motor of the present invention comprises an electronically commutated motor stator which is formed by a plurality of stator coils. The stator coils are controlled by a control electronics system which substantially consists of a control logic and a power section. The control electronics system is arranged in a closed electronics chamber which is situated on the dry side of the electric motor. The dry side can be separated from the wet side of the electric motor, for example, by a separating can.

The control electronics system is completely encapsulated in a cast body, thus protecting it from wetness and humidity. The electronics chamber can, but does not need to, comprise further electric components. The stator coils can, for example, also be arranged in the electronics chamber. The cast body does not fill the entire electronics chamber. A part of the electronics chamber is instead filled with air. This air-filled part of the electronics chamber is the gas chamber. The gas chamber is fluidically connected to the atmosphere surrounding the electric motor on the outer side via an aeration shaft. The aeration shaft passes through the cast body wherein, in the aeration shaft, a pressure equalization element is arranged which is gas-permeable but largely impermeable to liquids, for example, water.

The aeration shaft passes through the cast body in the manner of a snorkel, wherein, while the electronics chamber is being filled with a liquid casting compound, the electric motor is positioned so that the opening of the aeration shaft situated on the outer side of the motor is arranged at a lower height than the opening of the aeration shaft situated on the inner side, which opening is open toward the electronic chamber. The aeration shaft thus establishes a fluidic connection from the motor outer side to the gas chamber of the electronics chamber, with the aeration shaft extending through the cast body.

The process of filling the electronics chamber with a liquid casting compound mass is stopped before the level of the compound mass has reached the inner-side opening of the aeration shaft. Only as much casting compound is filled into the electronics chamber as is required to provide a moisture-proof sealing of the control electronics system. Only an absolutely necessary quantity of casting compound will therefore be used. Pressure equalization between the gas chamber and the surrounding atmosphere will always be safeguarded via the aeration shaft and/or the pressure equalization element arranged therein.

The pressure equalization element can be formed, for example, by two back-check valves arranged in opposite directions relative to each other. The pressure equalization element can, for example, be formed by a gas-permeable pressure equalization membrane which, although gas-permeable, is largely liquid-tight and/or water-tight.

In an embodiment of the present invention, the electronics chamber can, for example, be closed by a separate case cover to which the aeration shaft is fastened. The aeration shaft can, for example, project substantially vertically from the basic plane of the case cover into the electronics chamber and thus be arranged in a vertical orientation while the casting compound is being introduced.

In an embodiment of the present invention, the boundary plane between the cast body and the gas chamber can, for example, be arranged, in a height direction, between the opening plane of the aeration shaft on the gas chamber side and the basic plane of the case cover. The basic plane of the case cover can, for example, be arranged parallel to the boundary plane between the cast body and the gas chamber. The boundary plane should have a distance of one to several millimeters from the opening plane. The opening plane can, for example, be substantially parallel to the basic plane.

It is generally possible to use the aeration shaft as an opening to fill the electronics chamber with the liquid casting compound. A separate filling opening can, for example, be provided on the motor casing of the electric motor that is fluidically connected to the electronics chamber. The filling opening can, for example, be situated in a plane spaced apart from and/or above the boundary plane. The filling opening can, for example, be closed by a separate opening closure which, after the casting compound has been filled into the electronics chamber, will be placed in the filling opening.

The stator coils are arranged in a stator chamber which can, for example, fill a part of the gas chamber. The stator coils and the control electronics system are thus arranged in a sole electronics chamber. The volume of the gas chamber can, for example, be larger than the volume of the cast body and/or of the casting compound.

In an embodiment, the present invention also provides a method for producing the cast body in a motor vehicle auxiliary assembly electric, the method comprising:
  filling the liquid casting compound into the electronics chamber;
  stopping the filling when the control electronics system has been fully encapsulated by casting compound and before the casting compound has reached the level of the opening of the aeration shaft; and
  closing the filling opening by an opening closure.

The casting compound is filled, via the filling opening, from above into the electronics chamber until the electronics chamber is entirely encapsulated. The filling of the casting compound is stopped as soon as the control electronics system is completely enclosed by casting compound. Finally, the filling opening via which the casting compound has been filled into the electronics chamber is closed. It is thereby rendered possible in a simple manner to generate a liquid-tight encapsulation for the control electronics system when the latter has already been installed. The consumption of casting compound will be relatively moderate since only the control electronics system will be encapsulated. The gas chamber which cannot be avoided in the process will be aerated via the aeration shaft and the pressure equalization element arranged in the shaft, thus preventing a pressure gradient between the gas chamber and the surrounding atmosphere.

An exemplary embodiment of the present invention will be explained in greater detail hereunder with reference to the drawing.

FIG. 1 shows a motor vehicle auxiliary assembly 9 which in the present case is realized as an electric water pump. The auxiliary assembly 9 is driven by an electric motor 10 which is electronically commutated. In the present case, the electric motor 10 is designed as a so-called external rotor motor and comprises a pot-shaped motor rotor 14 which is arranged around a central coaxial motor stator 12 formed by a plurality of stator coils 11. The motor rotor 14 is integrally connected to a pump rotor 16 comprising a plurality of rotor blades 17. Motor rotor 14 and motor stator 12 are arranged coaxially to a longitudinal axis 18 and together form the one-pieced rotor.

The auxiliary assembly 9 stands with its longitudinal axis 18 vertical on a horizontal plane 7, the motor rotor 14 being arranged on top. In this position of auxiliary assembly 9, the casting compound will be filled in, as will be described below.

Motor stator 12 and motor rotor 14 are separated from each other in a liquid-tight manner by a separating tube 20. Separating tube 20 is a part of a separating can 23 provided for a fluid-tight separation of the wet side of auxiliary assembly 9 from the dry side. The separating can 23 holds a rotor axis 18' on which the motor rotor 14 is supported via a slide bearing 15.

The auxiliary assembly 9 comprises a casing 21 which together with the separating can 23 and a case cover 50 encloses the dry side that includes an electronics chamber 38, a gas chamber 35, and the stator coils 11. In relation to the stator coils 11, the electronics chamber 38 is arranged on the side of auxiliary assembly 9 facing away from the rotor. The lower distal side of electronics chamber 38 is closed by case cover 50.

Arranged in electronics chamber 38 is a control electronics system 30 substantially formed of a board 31 on which electronic components 33 are arranged and are connected to each other by conducting paths. The electronic components 33 are power semiconductors to be controlled by the stator coils 11 and analog and digital electronic components to be controlled by the power semiconductors. In the spatial orientation of auxiliary assembly 9 shown in FIG. 1, the basic plane of case cover 50 and the basic plane of board 31 are arranged substantially parallel to each other in a horizontal transverse plane of auxiliary assembly 9.

The control electronics system 30 is cast into a cast body 32 consisting of a hardened casting compound 34. The upper cast-body boundary plane 46 between the cast body 32 and the gas chamber 35 thereabove is arranged in a horizontal plane, i.e., in a transverse plane of auxiliary assembly 9.

Case cover 50 comprises a non-centrically arranged aeration shaft 40 which has a vertical orientation, i.e., an orientation parallel to longitudinal axis 18. Aeration shaft 40 has a tubular shape and comprises a gas-chamber-side opening 47 whose opening plane 48 is again arranged in a transverse plane of auxiliary assembly 9. The opening plane 48 is situated a few millimeters above the boundary plane 46.

Aeration shaft 40 has a pressure equalization element 42 assigned to it which in the present case is formed as a gas-permeable pressure equalization membrane 44. The pressure equalization element 42 is here arranged at the opening on the outer side but can also be arranged internally of aeration shaft 40. The gas-permeable pressure equalization membrane 44 can, for example, be a textile PTFE membrane. The atmosphere 8 surrounding the auxiliary assembly 9 is pneumatically connected to the gas chamber 35 within electronics chamber 38 via the aeration shaft and the pressure equalization element 42. It is thereby provided that no pressure gradient can occur between the gas chamber 35 and the atmosphere surrounding the auxiliary assembly 9.

A separate filling opening 60 is provided at a site on the periphery of the auxiliary assembly, which, via a vertical filling duct 62, is fluidically connected to electronics chamber 38. The liquid casting compound is filled in through the filling opening 60. The filling of the casting compound is stopped as soon as the control electronics system 30 has been entirely enclosed by filling compound and before the boundary plane 46 of the hardened casting compound 34 has reached the opening plane 48 of aeration shaft 40. The filling opening 60 is subsequently closed by an opening closure 64.

The present invention is not limited to embodiments described herein; reference should be had to the appended claims.

What is claimed is:

1. A motor vehicle auxiliary assembly electric motor, comprising
    a motor stator comprising stator coils, the motor stator configured to be electronically commutated;
    a control electronics system configured to drive the stator coils;
    a cast body, the control electronics system being potted in the cast body;
    an electronics chamber configured to be closed-off and to have the control electronics system and the cast body be arranged therein;
    a gas chamber arranged adjacent to the cast body;
    a pressure equalization element configured to ventilate and vent the gas chamber; and
    an aeration shaft arranged to pass through the cast body and which is configured to fluidically connect the gas chamber to the atmosphere, the pressure equalization element being fluidically associated with the aeration shaft.

2. The motor vehicle auxiliary assembly electric motor as recited in claim 1, further comprising:
    a case cover to which the aeration shaft is fastened, the case cover being configured to close the electronics chamber.

3. The motor vehicle auxiliary assembly electric motor as recited in claim 2, wherein,
    the case cover comprises a basic plane, and
    the aeration shaft is further configured to project substantially vertically from the basic plane of the case cover into the electronics chamber.

4. The motor vehicle auxiliary assembly electric motor as recited in claim 3, further comprising:
    a boundary plane,
    wherein,
    the aeration shaft comprises an opening plane, and
    the boundary plane is arranged between the cast body and the gas chamber and between the opening plane of the aeration shaft on a gas chamber side and the basic plane of the case cover.

5. The motor vehicle auxiliary assembly electric motor as recited in claim 4, further comprising:
    an opening closure; and
    a motor casing which comprises a separate filling opening, the separate filling opening being configured to be fluidically connected to the electronics chamber and to be closed by the opening closure.

6. The motor vehicle auxiliary assembly electric motor as recited in claim 1, further comprising:
    a stator chamber which forms a part of the gas chamber,
    wherein, the stator coils are arranged in the stator chamber.

7. The motor vehicle auxiliary assembly electric motor as recited in claim 1, wherein the pressure equalization element is formed by a gas-permeable pressure equalization membrane.

8. The motor vehicle auxiliary assembly electric motor as recited in claim 1, further comprising:
    a separating can,
    wherein, the motor stator is fluidically separated from the motor rotor by the separating can.

9. A method for producing a cast body in the motor vehicle auxiliary assembly electric motor as recited in claim 5, the method comprising the steps of:
    filling a liquid casting compound through the separate filling opening into the electronics chamber;
    stopping the filling as soon as the control electronics system has been completely encapsulated and before the liquid casting compound has reached the opening plane of the aeration shaft; and
    closing the separate filling opening via the opening closure.

* * * * *